Jan. 24, 1928.
F. S. DIXON
1,657,376
CARBURETOR
Filed Feb. 20, 1923
3 Sheets-Sheet 1
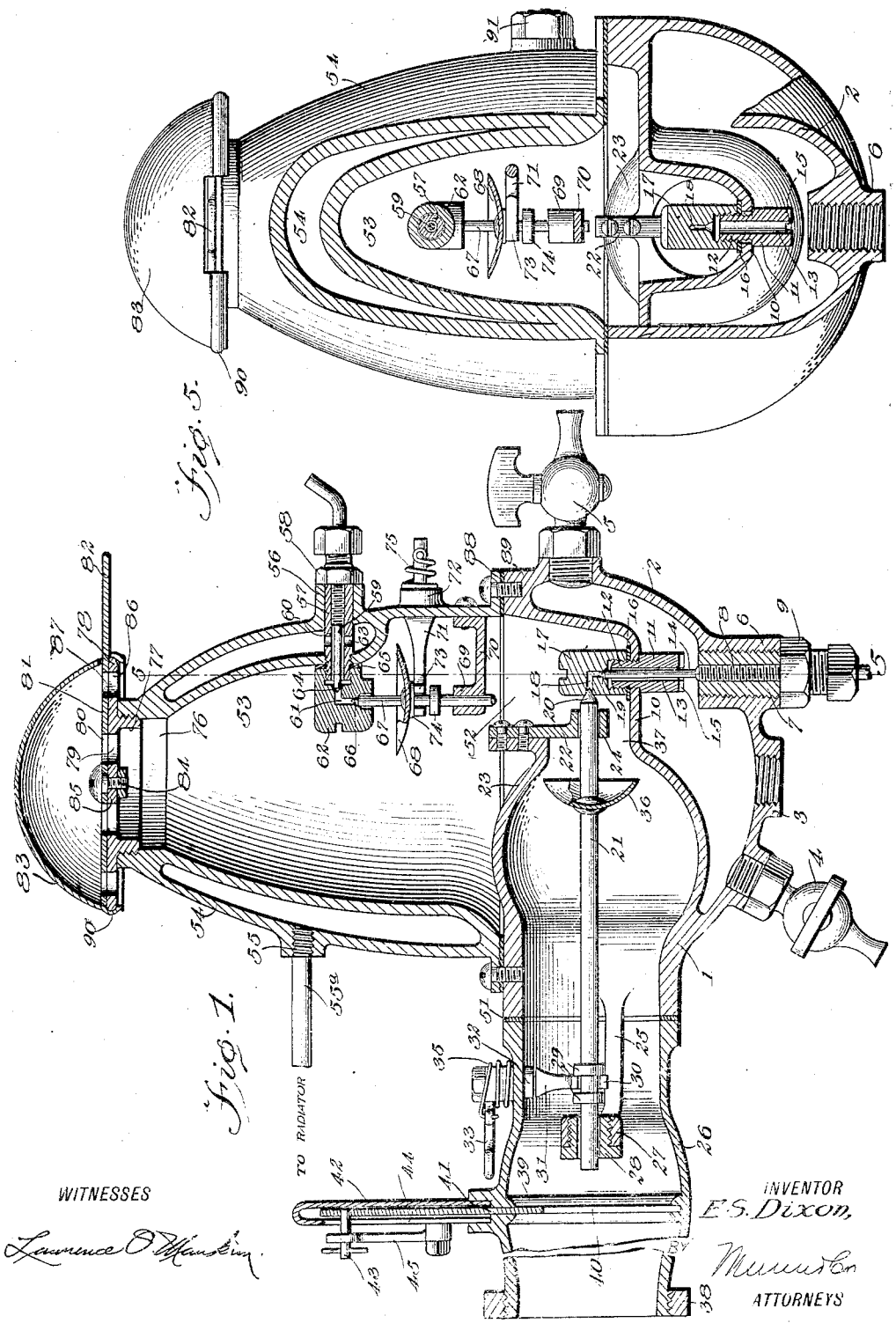
WITNESSES
INVENTOR
F. S. Dixon,
ATTORNEYS

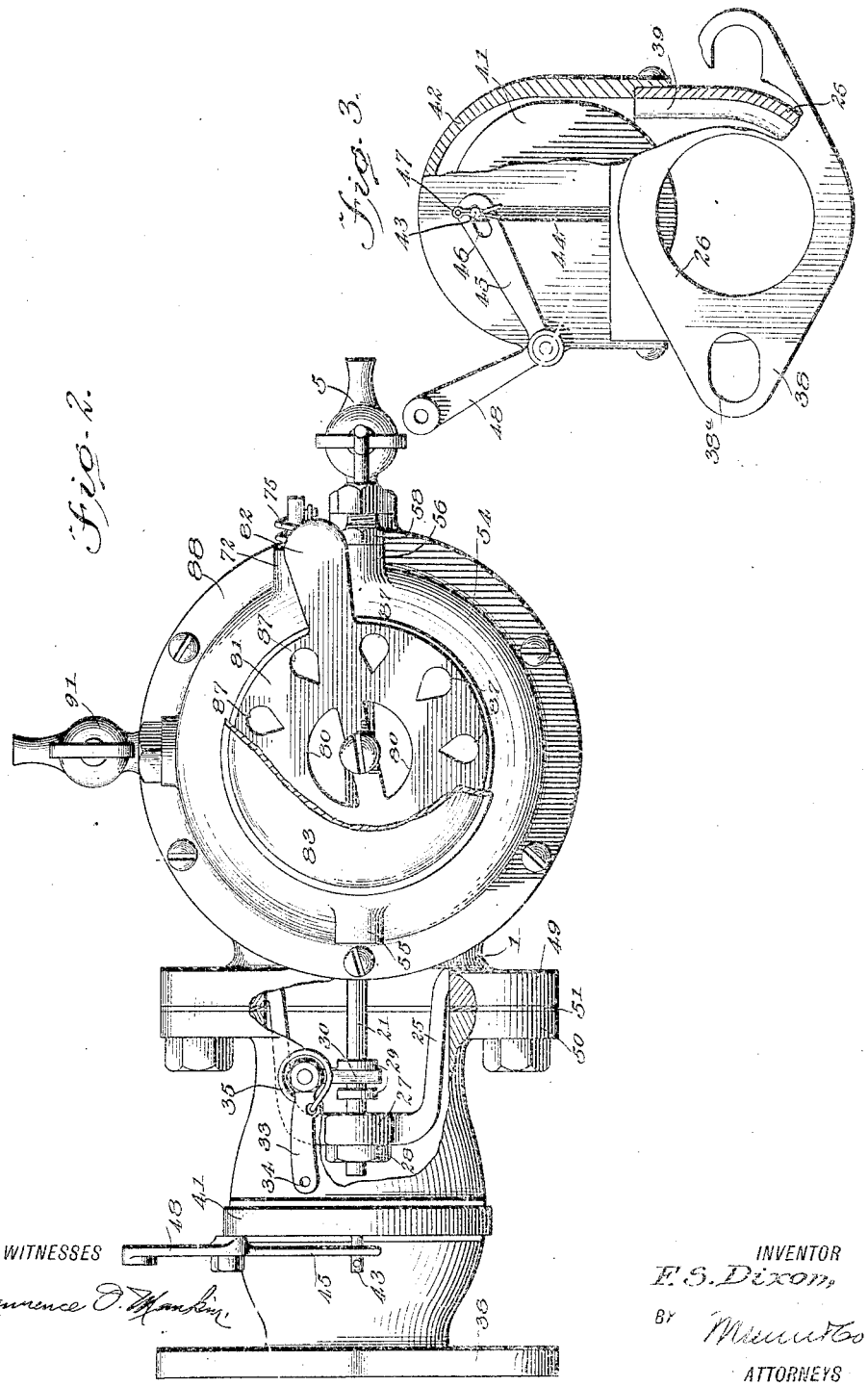

Jan. 24, 1928.  
F. S. DIXON  
CARBURETOR  
Filed Feb. 20, 1923

WITNESSES

INVENTOR  
F. S. Dixon.  
BY  
ATTORNEYS

Patented Jan. 24, 1928.

1,657,376

UNITED STATES PATENT OFFICE.

FURNIE S. DIXON, OF SARASOTA, FLORIDA.

CARBURETOR.

Application filed February 20, 1923. Serial No. 620,307.

This invention relates to carburetors and has for its object the provision of a charge forming device for supplying an internal combustion engine with an intimate mixture of air, vaporized fuel and water.

A further object of the invention is the provision of a carburetor having a mixing chamber, an integrally formed fuel chamber with a valve controlled passage connecting the fuel chamber with the mixing chamber and so positioned that the fuel will always be fed through the said passage irrespective of the position of the mixing chamber.

Another object of the invention is the provision of a device having a mixing chamber and a fuel chamber, a valve controlled passage connecting the fuel chamber with the mixing chamber, an air passage in communication with the mixng chamber provided with a water jacket having a valve controlled passage with the air passage, and a water jacket heating the air passage and supplying water to the same.

A still further object of the invention is the provision of a device for supplying a combustible mixture to an engine and having automatic means for controlling the flow of fuel and a separate automatic means for controlling the flow of water to the mixing chamber in accordance with the needs of an engine to which it is connected.

Another object of the invention is the provision of a device having a mixing chamber and correlated fuel and hot water chambers, with valve controlled passages for supplying the mixing chamber with water and fuel, the passages being so located that regardless of the position of the mixing chamber the water and fuel chambers will supply the mixing bowl with oil and water.

Another object of the invention is the provision of a device having a mixing chamber adapted to be supplied with water, fuel and air, independent and automatically operated valves for controlling the fuel and water with manual means for controlling the flow of fuel irrespective of the automatic means.

Other objects and advantages will become apparent during the course of the following description.

The invention is illustrated by way of example in the accompanying drawings, in which, Figure 1 is a longitudinal vertical section of a carburetor constructed in accordance with the principles of my invention.

Figure 2 is a plan view of the same.

Figure 3 is an end view with parts broken away to show the throttle.

Figure 5 is a vertical transverse section of the carburetor taken along the line 5—5 of Figure 4.

Figure 4:
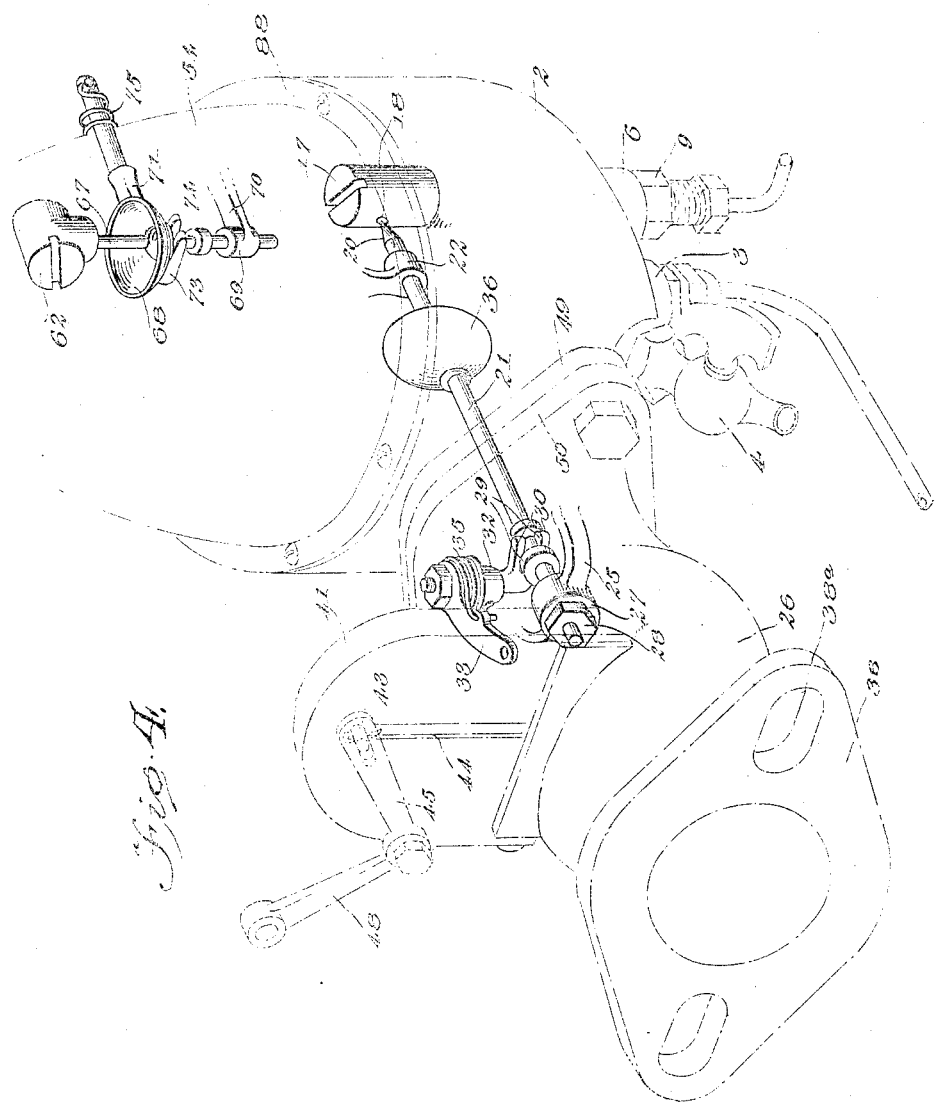
Figure 4 is a view in perspective of my carburetor shown in dotted lines with the automatically controlled valve for fuel and water shown in full.

Referring to the drawings, 1 designates a mixing chamber having an integrally formed fuel chamber 2 offset from one end of the mixing chamber. Fuel is supplied to the chamber 2 through a tubing adapted to be connected to the internally threaded passage in a boss 3 projecting outwardly from the chamber 2.

A stop-cock 4 is connected with one end of the chamber 2 while a second stop-cock 5 is connected with the other end of the chamber. These cocks are for the purpose either of releasing air in the chamber 2 when said chamber is being filled with fuel or for draining the chamber, depending upon the position of the mixing chamber 1. The position of the mixing chamber as shown in Figure 4 limits the stop-cock 4 to a drain, while the stop-cock 5 is limited to a means for releasing air pressure in the chamber.

An internally threaded hollow boss 6 is located intermediate the stop-cocks 4 and 5 into which is screwed a hollow plug 7 provided with a threaded passage into which is adapted to be screwed a valve stem 8. A nut 9 on the plug 7 is adapted to lock the plug in position on the boss 6.

A partition 10 forms an inner wall of the chamber 2 and a portion of the wall of the mixing chamber 1. A plug 11 having a reduced threaded portion 12 screwed into a threaded opening in the partition 10 is provided with a longitudinal pasage 13 of sufficient diameter to permit fuel in the chamber 2 to pass upwardly along the reduced portion 14 of the stem 8. At the point on the plug 11 where the reduced portion 12 joins said plug is provided a shoulder which engages the under surface of the partition 10. The outer end of the plug is provided with a tool engaging groove 15 whereby the plug may be screwed up tight. The opening in the boss 6 is of sufficient diameter to permit the plug 11 to be inserted through said opening and screwed into position in the partition 10.

A gasket 16 is secured in position between the partition 10 and a plug 17. This plug has a threaded recess at its lower end adapted to engage the threads on the reduced portion 12 of the plug 11.

The plug 17 is provided with a passage 18 which is controlled at one end by a valve 19 on the end of the valve stem 8, and the other end of the passage is controlled by an automatically operated valve 20 engaging a seat at said end of the passage and forming one end of a valve stem 21 which is slidably mounted longitudinally of the mixing chamber 1.

A bracket 22 rigidly secured to an end of the upper portion 23 of the mixing chamber is provided with a bearing 24 in which the inner end of the stem 21 is slidable. Adjacent the rear end of the stem 21 is a bracket 25 which extends outwardly from the mixing chamber 1 into a tubular member 26 and is provided with an internally threaded boss 27 into which is screwed a bearing 28 for the rear end of the stem 21. The stem is provided with a pair of collars 29 between which is mounted a yoke 30 engaging the stem 21 and formed on the lower end of a rock shaft 31. The rock shaft is mounted in a hollow boss 32 formed integrally with the wall of the tubular member 26. Rigidly connected with the end of the shaft 31, which extends outwardly of the tubular member 26, is a lever 33 provided with a perforation 34 at its outer end adapted to be connected to a rod which extends to the dash of an automobile for manually operating the shaft and likewise the stem 21 and valve 20 longitudinally of the mixing chamber 1.

A spring 35 having one end connected with the lever 33 and the other end with the tubular member 26 is adapted to maintain the valve 20 closed upon its seat in the plug 17. A semi-spherical member 36, mounted on the stem 21 adjacent the bracket 22 is adapted to be affected by the air flowing through the restricted opening 37 at the inner end of the mixing chamber 1 for automatically moving the valve 20 away from its seat when the engine is operating.

The outer end of the tubular member 26 is threaded upon which is adapted to be screwed an elongated plate 38 which forms a flange for connecting the carburetor to the intake manifold of an engine. The projecting ends of the plate 38 are provided with elongated slots 38ª whereby the carburetor may be connected to intake manifolds of varying sizes.

The tubular member 26, midway of its ends is enlarged and provided with an annular rib 39 having a groove 40 in which is adapted to slide a throttle valve 41. As shown more particularly in Figure 3, this throttle valve 41 is circular and is adapted to close the passage in the tubular member 26. A casing 42, which is connected to the enlarged portion of the tubular member 26, provides a housing for the valve 41 when the same is in its uppermost position.

A pin 43 is rigidly connected to the valve 41 adjacent the upper end of the vertical diameter of said valve and movable in a slot 44 in one face of the housing 42. A bell crank lever 45 has at one end an elongated slot 46 adapted to receive the pin. A cotter pin 47 locks the sloted end of the bell crank lever 45 to the pin 43. The other end 48 of the bell crank lever 45 is adapted to be connected to an operating rod extending to the dash for manual operation of the throttle valve 41.

The outer end of the mixing chamber 1 is provided with a flange 49 which is adapted to be bolted to a corresponding flange 50 formed on the inner end of the tubular member 26. A gasket 51 is located between the abutting ends of these members. The inner open end 52 of the mixing chamber 1, which is in advance of the bracket 22, has mounted thereon a conical air passage 53 having an external water jacket 54 which is supplied by water through an internally threaded boss 55 connected to a tube 55ª. The tube 55ª is in communication with the radiator of the engine for supplying hot water to the water jacket 54.

The water jacket is provided with a hollow boss 56 into which is inserted a plug 57 having its inner end threaded and screwed into a threaded opening in the wall of the air passage 53. The outer end of the plug 57 is threaded and engaged by a nut 58 for locking the plug on the boss 56. The plug is provided with an internally threaded passage adjacent one end into which is screwed the threaded portion of a valve stem 59. The portion of the longitudinal passage in the plug 57 adjacent the unthreaded portion of the stem 59 is of such a diameter as to provide a passage 60 for water from the water jacket 54 to a passage 61 in a plug 62.

Radial perforations 63 are formed in that portion of the plug 57 which is located within the water jacket 54 and connected directly to the passage 60. The inner end of the stem 59 coacts with a valve seat 64 to control the flow of water from the passage 60 to the passage 61 and plug 62.

The plug 62 is provided with an internally threaded recess at one end which is adapted to be screwed onto the threaded end of the plug 57 projecting into the air chamber 53. A gasket 65 is forced up tight against the inner wall of the air passage 53 and prevents leaking of water from the water jacket to the air chamber. A suction operated valve 66 controls the end of the passage 61 which leads into the air chamber 53 and is integrally formed at one end of a reciprocating valve stem 67. The valve stem is provided with a dish-shaped member 68 which is adapted to be effected by the air passing through the chamber 53 when the engine is operated.

The outer end of the stem 67 is slidable in a bearing 69 mounted in a bracket 70 which is connected to the inner wall of the chamber 53. A rock shaft 71 is mounted in a hollow boss 72 formed on the outer wall of the chamber 53 and is provided with a yoke 73 embracing the valve stem 67 between the collars 74. A spring 75 on the shaft 71 has one end secured to said shaft with the other end secured to the boss 72.

The outer reduced end 76 of the air chamber 53 is internally threaded and adapted to engage the externally threaded annular flange 77 formed integrally with a disc 78. The disc is provided with semi-circular openings 79 adapted to aline with semi-circular openings 80 in a rotatable disc 81. Said disc is manually operated by an arm 82 extending through an arcuately shaped slot in a cover 83. A threaded stud 84 screwed into a threaded perforation in a rib 85 of the disc 78 and held in place by a nut is adapted to form a pivot upon which the disc 81 is rotated.

Adjacent the periphery of the disc 78 are formed a series of heart-shaped openings 86 which are adapted to aline with the heart-shaped openings 87 in the rotatable disc 81 and when so alined air passes through said openings into the cap 83 through the openings 79 and 80 into the air chamber 53.

The air chamber 53 is provided at its lower end with an annular flange 88 which is adapted to be secured by means of threaded studs to an annular shoulder 89 formed on the upper surface of the mixing chamber 1 and the upper peripheral edge of the partition 10 and the outer wall of the fuel chamber 2 where said partition and wall meet.

The portion of the cap 83 adjacent its periphery is provided with a groove 90 which is adapted to engage the rounded periphery of the disc 78 and lock said cap on the disc. A stop-cock 91 shown in Figure 2, is connected with the water jacket 54 at its lower end for draining the same.

The operation of my device is as follows:

The carburetor is connected to the intake manifold of an engine through the removable flange 38. When the engine is operated and the rotatable disc 81 has been moved to the proper position for admitting air through the alined perforations 86 and 87 and 80 and 79, air is drawn through the chamber 53 across the disc-shaped member 68 moving said member downwardly and carrying with it the stem 67 and removing the valve 66 from its seat in the passage 61. Water is drawn from the water jacket 54 with the air. As the air passes the restricted opening 37 leading into the mixing chamber 1 it acts upon the disc-shaped member 36 withdrawing the valve 20 from its seat and admitting a proper quantity of fuel from the fuel chamber 2. The fuel and water are carried in an intimate mixture with the air into the engine. The throttle valve 41 is operated to control the flow of mixture to the engine. In starting the engine the lever 33 may be actuated to admit a greater quantity of fuel from the chamber 2.

It will be noted, due to the venturi effect of the restricted opening 37, at the entrance of the mixing chamber 1, that the increased velocity of the air will be greater upon the member 36 for operating the valve 20 than upon the member 68 which controls the valve 66, thereby admitting a greater quantity of fuel to the engine in proportion to the quantity of water. Further it will be noted that in view of this differential action between the operation of the cup-shaped members 36 and 68 that more water will be admitted at high speeds and in proportion to the speed attained than at low speeds. The flow of fuel and also the flow of water is controlled by adjusting the needle valves 19 and 64 respectively by operating handles which extend beyond the outer wall of the casing. Since hot water is used in the water jacket 54 from the radiator, air in the passage 53 will be heated on its way towards the engine and the water admitted through the passage 61 to the air chamber will likewise be warm thereby providing a means for more readily atomizing the water and humidifying the air therewith.

It will be evident, also, from the construction disclosed that water drawn from the water jacket 54 into the air chamber is necessarily broken up into fine particles as spray through contact with the baffle member 68 and by the rush of indrawn air past said member. An intimate mixture of air and spray forming a mist is therefore produced, this mist being drawn through the restricted opening 37 and forming with the fuel drawn through the valve controlled inlet 18 a further and intimate mixture of moisture laden air and fuel.

The spring 35 returns the valve 20 on its seat for closing the passage 18 when the engine is stopped by rotating the shaft 21, the oscillating yoke at the end of the shaft engaging the collar 29 causing an inward movement of the stem 21. The spring 75 on the shaft 71 produces a similar result for closing the valve 66 and preventing the flow of water through the passage 61 when the engine is stopped.

Due to the position of the passage 18 relative to the fuel chamber 2 and likewise due to the position of the passage 61 relative to the water jacket 54 the mixing chamber 1 may be located in any position without interfering with the supply of fuel and water through these passages to the incoming air.

The passage which connects the air passage 53 with the mixing chamber 1 is formed by a curved portion of the partition 10 and is restricted relative to the passage 53 thereby speeding up the flow of air when entering said mixing chamber.

What I claim is:

1. A carburetor for internal combustion engines comprising a mixing chamber having a throttle controlled end adapted to communicate with the intake manifold of an engine and its other end communicating with an air inlet chamber through a restricted passage, a fuel inlet between the air inlet and restricted passage of said mixing chamber, a rod supported for longitudinal movement axially of said mixing chamber, a cup-shaped member being arranged upon the rod in spaced relation to the restricted passage with its concave face in opposing relation to the passage whereby with a flow of air through said passage the rod will be shifted, means controlled by said rod for regulating the flow of fuel into said air chamber, and means positioned between said fuel and air inlets and constructed and arranged controllably to feed water into said air chamber.

2. A carburetor for internal combustion engines comprising a mixing chamber having a throttle controlled end adapted to communicate with the intake manifold of an engine and its other end communicating with an air inlet chamber through a restricted passage, a fuel inlet between the air inlet and restricted passage of said mixing chamber, means controllably to supply water to said air inlet chamber at a point between said fuel and air inlets, a rod supported for longitudinal movement axially of the mixing chamber, a baffle member carried by the rod and arranged upon the rod in spaced relation to the restricted passage whereby a current of air flowing from the air chamber into the mixing chamber will actuate said rod, and a valve operated by movement of the rod for controlling the fuel inlet into said air chamber.

3. In a carburetor, an air passage, means for controlling the flow of air to the air passage comprising a disc projecting beyond the periphery of the end of the air passage and having a pair of openings adjacent its center and a plurality of heart-shaped openings adjacent its periphery, said heart-shaped openings being located in that portion of the disc which is beyond the peripheral edge of the air passage, a semi-spherical cap mounted on said disc, a second disc rotatably mounted on the first mentioned disc and provided with a pair of centrally located openings adapted to aline with the centrally located openings in the first mentioned disc, and heart-shaped openings adjacent its periphery adapted to aline with the heart-shaped openings of the first mentioned disc, and means projecting through the cap for operating the second mentioned disc, said cap forming a means for connecting the alined heart-shaped openings with the centrally disposed openings in the stationary and rotary discs when alined.

4. A carburetor for internal combustion engines comprising a mixing chamber having a throttle controlled end adapted for communicating with the intake manifold of an engine, and its other end communicating through a restricted passage with an air chamber having an air inlet, a fuel inlet arranged within the air chamber adjacent the restricted passage to the mixing chamber, a water inlet arranged between the fuel inlet and air inlet, a baffle member in the air chamber adapted to be actuated with a current of air passing therethrough to the mixing chamber, means whereby said baffle member may control the water inlet, means within the mixing chamber adjacent the restricted passage adapted to be actuated by a current of air passing into the mixing chamber from said air chamber, and means whereby the last named means may control the fuel inlet.

5. A carburetor for internal combustion engines comprising a mixing chamber having a fuel delivery end adapted for connection to the intake side of an engine and having its other end communicating with an air inlet chamber through a restricted passage, a valved fuel inlet adjacent to the restricted passage of said mixing chamber, a valved water inlet opening into the air chamber, and valve actuating baffles actuated responsively to engine created suction through said air and mixing chambers to draw water and fuel into said air and mixing chambers, respectively, the baffle controlling said water inlet comprising a plate having its face concaved in the direction of air intake and alined with the water inlet.

FURNIE S. DIXON.